Figure 1:
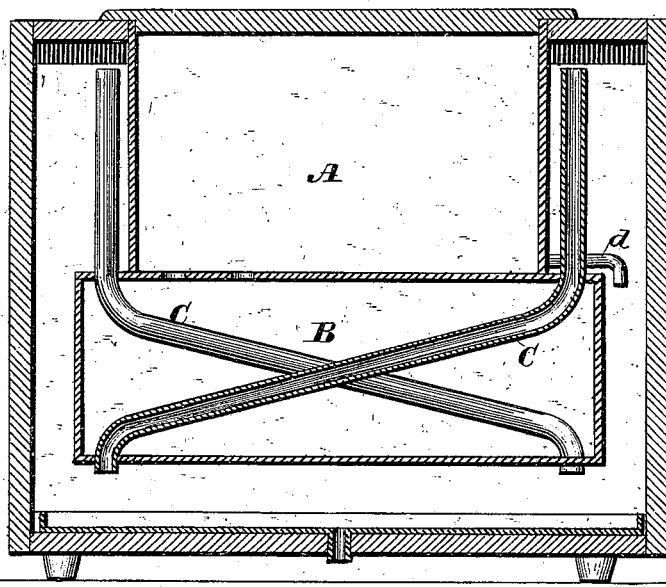

(No Model.)

A. J. CHASE.
Refrigerator.

No. 229,956.            Patented July 13, 1880.

Attest:
J. Henry Kaiser
J. A. Rutherford

Inventor:
Andrew J. Chase.
By James L. Norris,
Atty.

N. PETERS, PHOTO-LITHOGRAPHER, WASHINGTON, D. C.

UNITED STATES PATENT OFFICE.

ANDREW J. CHASE, OF BOSTON, MASSACHUSETTS.

REFRIGERATOR.

SPECIFICATION forming part of Letters Patent No. 229,956, dated July 13, 1880.

Application filed April 7, 1880. (No model.)

*To all whom it may concern:*

Be it known that I, ANDREW J. CHASE, a citizen of the United States, residing at Boston, in the county of Suffolk and State of Massachusetts, have invented new and useful Improvements in Refrigerating Apparatus, of which the following is a specification.

This invention relates to certain improvements in refrigerators of that class in which the air contained in said refrigerator is cooled by means of a refrigerating mixture contained in a suitable receptacle or compartment, the air being caused to automatically circulate through a provision-chamber containing perishable articles, whereby the vapors of such articles are removed as fast as exhaled, and the said articles are kept at a low temperature.

In refrigerators of this class as heretofore constructed the air has generally been made to circulate in contact with the external walls of the vessel containing the refrigerating material, and in this manner the air is slowly and imperfectly cooled and the full effect of the refrigerating material is not obtained. The refrigerating material in such apparatus generally consists of a mixture of ice and salt, and as fast as the ice melts by the action of the salt thereon the resulting liquid or solution is allowed to escape and go to waste. This liquid is exceedingly cold, and being thus allowed to go to waste, a large amount of effective refrigerating material is lost.

The object of my invention is to obviate these objections and provide for more effectively and rapidly cooling the air in the provision-chamber, and to utilize the liquid resulting from the melting of the ice to assist in the refrigerating process.

To this end my invention consists in the combination, in a refrigerator, of a preserving-chamber, an air-refrigerating chamber separated therefrom by a practically vertical partition having passages through it at top and bottom, an ice-receptacle situated in the upper portion of said refrigerating-chamber, a waste-water receptacle arranged below and connected with said ice-receptacle, and one or more air-pipes, open at both ends, extending from the upper portion of the refrigerating-chamber inside the refrigerator, through the waste-water receptacle, toward the bottom of the said refrigerating-chamber, whereby the air in the upper portion of said refrigerating-chamber will be cooled and flow downward in contact with the external walls of the ice-receptacle and waste-water receptacle, and through the pipes passing through said waste-water receptacle, being further cooled thereby, and, flowing through the passage or passages at the bottom of the dividing-wall, will come in contact with the articles in the preserving-chamber, and when warmed thereby will rise and flow through the passages at the top of said dividing-wall back to the upper portion of the refrigerating-chamber, and a constant rapid flow of cold air will be thus maintained from the refrigerating to the preserving chamber, and the waste water utilized as a refrigerating material.

Figure 2:
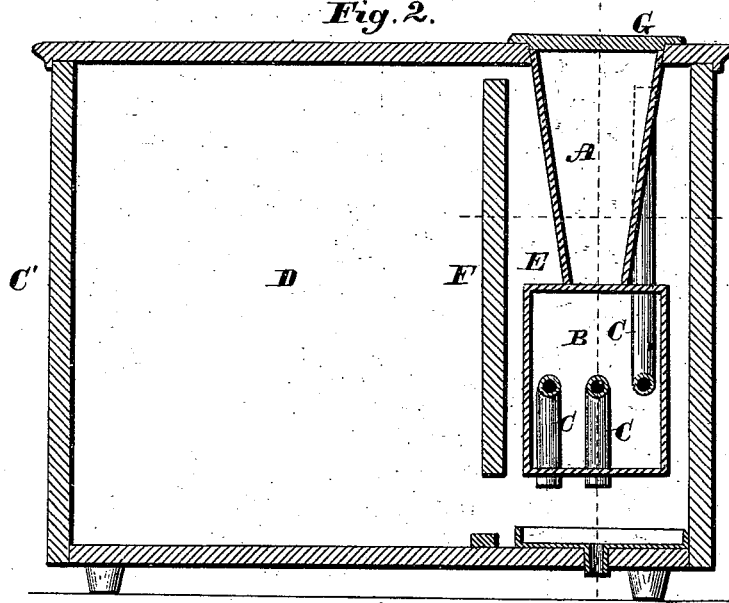
Figure 3:
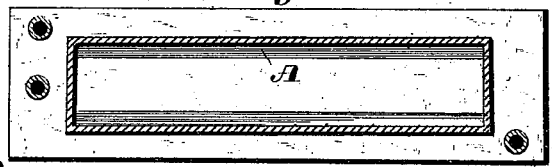

In the drawings, Figure 1 represents a transverse vertical section of a refrigerator, showing my invention; Fig. 2, a longitudinal vertical section of the same; Fig. 3, partially a horizontal section and partially a top view of my refrigerating device detached.

The letter A indicates the vessel for containing refrigerating material, constructed of metal or other suitable material and provided with an escape-pipe, *a*. The said vessel is rectangular in horizontal section, and the sides are gradually contracted from top to bottom, as shown in Fig. 2 of the drawings.

The letter B indicates the vessel for collecting and holding the liquid resulting from the melting of the ice. The said vessel is rectangular in shape and projects beyond the vessel at each end, as shown in Fig. 1 of the drawings.

The letter C indicates one or more pipes or air-conduits, through which air is caused to circulate automatically, as more fully hereinafter described. As illustrated in Figs. 1, 2, and 3, these pipes extend diagonally through the chamber B, from bottom to top thereof, and then upward at each end of the receptacle A, terminating a short distance below the top thereof. As shown in Fig. 4, the pipes extend diagonally directly through the vessel containing the refrigerating material.

The letter C' indicates the refrigerator, divided into two compartments, D and E, by means of a partition, F, having openings at the top and bottom, by which communication between the two compartments is established.

The refrigerating apparatus is located in the compartment E, its top setting in an opening in the upper part of said compartment for convenience in filling, and is provided with a removable cover, G. The compartment is of sufficient size to leave a space at all sides of the refrigerating device for the circulation of cold air.

The operation of my invention is as follows: As the column of air in the pipes is cooled its gravity is increased, and it flows out at the lower ends of said tubes, causing a constant circulation through the same. As indicated in Figs. 1, 2, and 3, the air enters the pipes from the upper part of compartment E, and escapes at the lower part, and at the same time a downward current is established on the outside of the refrigerating-vessel, the two currents uniting and passing in volume into the lower part of the compartment D, in which the provisions or perishable articles are placed. As the cold air enters the chamber D at the bottom the warmer air is expelled into compartment E at the top, thus providing a constant circulation of cold air through the provision-chamber. As the ice melts the liquid in the ice-receptacle passes into the vessel below, and as its temperature becomes elevated by the absorption of heat from the provisions it escapes through the pipe a and is carried off.

The refrigerator is provided with an exit-pipe at the bottom, as usual, for the escape of water of condensation.

It is evident that when the vessel B is employed, with the air-tube extending through it, the circulation will continue after the ice in the upper chamber is all consumed, as the chamber B will still contain a body of cold water which will keep up the circulation. This is an important advantage in case the ice-receptacle should accidentally become empty, as the cooling process will be kept up for a considerable length of time, preserving the articles until the ice-chamber can be refilled.

I am aware that air-tubes have been arranged through ice-boxes and waste-water boxes, in order that the air passing therethrough may be cooled and delivered at desired points, and I do not claim such an arrangement broadly.

Having thus described my invention, what I claim is—

The combination of the preserving-chamber D, the air-refrigerating chamber E, the partition F, having transverse passages through it at top and bottom, the ice-chamber A, located in the upper portion of the air-refrigerating chamber, the waste-water chamber B, located below and connected with said ice-chamber at its bottom, and the pipes C C, leading from the upper portion of said refrigerating-chamber through the waste-water chamber obliquely in opposite directions, and terminating below said waste-water chamber, the whole constructed and arranged to operate essentially as set forth.

In testimony whereof I have hereunto set my hand in the presence of two subscribing witnesses.

ANDREW J. CHASE.

Witnesses:
E. P. NETTLETON,
CHAS. FRANK DAY.